(12) United States Patent
Tezaur (10) Patent No.: US 9,245,328 B2
(45) Date of Patent: Jan. 26, 2016

(54) ALGORITHM FOR MINIMIZING LATENT SHARP IMAGE COST FUNCTION AND POINT SPREAD FUNCTION WITH A SPATIAL MASK IN A FIDELITY TERM

(71) Applicant: Nikon Corporation, Tokyo (JP)

(72) Inventor: Radka Tezaur, Belmont, CA (US)

(73) Assignee: NIKON CORPORATION (JP)

( * ) Notice: Subject to any disclaimer, the term of this patent is extended or adjusted under 35 U.S.C. 154(b) by 0 days.

(21) Appl. No.: 14/372,516

(22) PCT Filed: Mar. 11, 2013

(86) PCT No.: PCT/US2013/030227
§ 371 (c)(1),
(2) Date: Jul. 16, 2014

(87) PCT Pub. No.: WO2013/148139
PCT Pub. Date: Oct. 3, 2013

(65) Prior Publication Data
US 2014/0348441 A1 Nov. 27, 2014

Related U.S. Application Data (60) Provisional application No. 61/617,358, filed on Mar. 29, 2012.

(51) Int. Cl.
*G06K 9/40* (2006.01)
*G06T 5/00* (2006.01)
*G06T 5/20* (2006.01)

(52) U.S. Cl.
CPC ............... *G06T 5/004* (2013.01); *G06T 5/003* (2013.01); *G06T 5/20* (2013.01); *G06T 2207/10004* (2013.01); *G06T 2207/20048* (2013.01); *G06T 2207/20201* (2013.01)

(58) Field of Classification Search
CPC .......... G06T 5/003; G06T 5/004; G06T 5/20; G06T 2207/20192; G06T 2207/20201
USPC .......................................................... 382/255
See application file for complete search history.

(56) References Cited

U.S. PATENT DOCUMENTS 5,696,848 A 12/1997 Patti et al.
8,582,910 B2 * 11/2013 Zhang et al. .................. 382/255
(Continued)

FOREIGN PATENT DOCUMENTS

WO WO2013148139 A1 10/2013
WO WO2013148142 A1 10/2013

OTHER PUBLICATIONS

The International Preliminary Report on Patentability for PCT/US13/30252, Oct. 1, 2014, Nikon Corporation (related application).
(Continued)

*Primary Examiner* — Yubin Hung
(74) *Attorney, Agent, or Firm* — Roeder & Broder LLP; Steven G. Roeder (57) ABSTRACT

A method for deblurring a blurry image (18) includes utilizing a spatial mask and a variable splitting technique in the latent sharp image estimation cost function. Additionally or alternatively, the method can include the utilizing a spatial mask and a variable splitting technique in the PSF estimation cost function. The spatial mask can be in a fidelity term in either or both the latent sharp image estimation cost function and the PSF cost function. The latent sharp image estimation cost function can be used for non-blind deconvolution. Alternatively, one or both cost functions can be used for blind deconvolution.

19 Claims, 7 Drawing Sheets

(56) References Cited

U.S. PATENT DOCUMENTS

| | | |
|---|---|---|
| 2006/0279585 A1 | 12/2006 | Milanfar et al. |
| 2007/0217713 A1 | 9/2007 | Milanfar et al. |
| 2008/0175508 A1 | 7/2008 | Bando et al. |
| 2008/0175509 A1 | 7/2008 | Wheeler et al. |
| 2009/0046944 A1 | 2/2009 | Bilcu et al. |
| 2010/0166332 A1 | 7/2010 | Lee et al. |
| 2012/0042291 A1 | 2/2012 | Granik et al. |
| 2013/0242129 A1* | 9/2013 | Harmeling et al. ........ 348/222.1 |

OTHER PUBLICATIONS

The International Preliminary Report on Patentability for PCT/US13/30227, Oct. 1, 2014, Nikon Corporation.

The International Search Report and Written Opinion for PCT/US13/30227, May 20, 2013, Nikon Corporation (related application).

The International Search Report and Written Opinion for PCT/US13/30252, Jun. 14, 2013, Nikon Corporation.

Wang et al., A New Alternating Minimization Algorithm for Total Variation Image Reconstruction, SIAM J. Imaging Sciences, vol. I, No. 3(2008), pp. 248-272,© 2008 Society for Industrial and Applied Mathematics.

Yang et al., An Efficient TVL1 Algorithm for Deblurring Multichannel Images Corrupted by Impulsive Noise, SIAM J. Sci. Comput. 31, pp. 1-20, Dept. of Mathematics, Nanjing Univ. P.R. China, Dept. of Computational and Applied Mathematics, Rice University, Houston, TX USA, 2009.

Lee et al., High-quality non-blind image deconvolution with adaptive regularization, available online Jul. 23, 2011, pp. 653-663, J. Vis. Commun. Image R. © 2011 Elsevier Inc.

Cho et al., Handling Outliers in Non-Blind Image Deconvolution, ICCV 2011.

Xu et al., Two-Phase Kernel Estimation for Robust Motion Deblurring, ECCV 2010, pp. 157-170, Part I, LNCS 6311, Department of Computer Science and Engineering, The Chinese University of Hong Kong, © Springer-Verlag Berlin Heidelberg 2010.

Dolui, et al., Blind Deconvolution of Medical Ultrasound Images Using Variable Splitting and Proximal Point Methods, Biomedical Imaging: From Nano to Macro, IEEE International Symposium, Mar. 2011.

Shan, et al., High-Quality Motion Deblurring from a Single Image, ACM SIGGRAPH, New York, NY, USA, Article 73, 2008.

Esser, Ernie, Applications of Lagrangian-Based Alternating Direction Methdods and Connections to Split Bregman, Tech Rep. 09-31, UCLA, Mar. 2009.

U.S. Appl. No. 14/372,518, filed Jul. 16, 2014, with its entire file and prosecution history.

The International Preliminary Report on Patentability for PCT/US13/30227, Oct. 1, 2014, Nikon Corporation (related application).

The International Preliminary Report on Patentability for PCT/US13/30252, Oct. 1, 2014, Nikon Corporation.

* cited by examiner

ALGORITHM FOR MINIMIZING LATENT SHARP IMAGE COST FUNCTION AND POINT SPREAD FUNCTION WITH A SPATIAL MASK IN A FIDELITY TERM

RELATED APPLICATION

This application claims priority on U.S. Provisional Application Ser. No. 61/617,358, filed Mar. 29, 2012 and entitled "LATENT SHARP IMAGE COST FUNCTION AND POINT SPREAD FUNCTION COST FUNCTION WITH A SPATIAL MASK IN A FIDELITY TERM." As far as permitted, the contents of U.S. Provisional Application Ser. No. 61/617,358 are incorporated herein by reference.

BACKGROUND

Cameras are commonly used to capture an image of a scene that includes one or more objects. Unfortunately, some of the images are blurred. For example, movement of the camera and/or movement of the objects in the scene during the exposure time of the camera can cause the image to be blurred. Further, if the camera is not properly focused when the image is captured, the image can be blurred.

When blur is sufficiently spatially uniform, a blurred captured image can be modeled as the convolution of a latent sharp image with some point spread function ("PSF") plus noise, $$B=K*L+N. \quad\quad \text{Equation (1)}$$

In Equation 1 and elsewhere in this document, (i) "B" represents a blurry image, (ii) "L" represents a latent sharp image, (iii) "K" represents a PSF kernel, and (iv) "N" represents noise (including quantization errors, compression artifacts, etc.).

A non-blind deconvolution problem seeks to recover the latent sharp image L only when the PSF kernel K is known. Alternatively, a blind deconvolution problem seeks to recover both the PSF kernel K and the latent sharp image L. Both the blind deconvolution problem and non-blind deconvolution problem are difficult to accurately solve because they are ill conditioned, and some information has been irretrievably lost due to zero and near zero values in the corresponding optical transfer function ("OTF"), Fourier transform of the PSF.

Further, the blind deconvolution problem is extremely difficult to solve because there are more unknowns than known variables. Further, infinitely many arrays exist that satisfy Equation (1), but only some of them make sense and are useful as solutions to the blind deconvolution problem, which seeks a PSF kernel K that characterizes blur present in the given blurry image.

Moreover, many blurry images include areas that further complicate the problem of recovering a latent sharp image L. For example, extremely bright areas where the sensor pixels reach their saturation point in the blurry image B can adversely influence the determined PSF kernel K and the resulting latent sharp image L.

Further, certain depth layers of a blurry image B will have a different blur PSF kernel. For example, consider a blurry image B that includes something in the foreground (e.g. people) and something in the background (e.g. mountains). If the main subject in the foreground is not properly focused, both the foreground and the background of the blurry image B can be blurred, but to a different degree. Considering the previous example, it may only be desired to deblur the people in the foreground, while allowing the mountains in the background to remain blurred. Additionally, many current deconvolution methods often result in a latent sharp image L having ringing artifacts around strong edges in the image and around image boundaries.

One common approach to solving a deconvolution problem includes reformulating it as an optimization problem in which suitable cost functions are minimized in order to find a solution to the deconvolution problem. For example, the blind deconvolution problem is often solved in iterations by minimizing two cost functions in alternating fashion. More specifically, the blind deconvolution problem is often solved in iterations by minimizing a latent sharp image estimation cost function, and by minimizing a PSF estimation cost function in alternating fashion. In this example, the step of minimizing the latent sharp image cost function is equivalent to solving a non-blind deconvolution problem. Further, the step of minimizing the PSF estimation cost function is similar, except the roles of the variables (K and L) are swapped.

In addition to alternating minimization of the latent sharp image estimation cost function, and the PSF estimation cost function, it is also common to use a multi-resolution approach, where first the coarse versions of the latent sharp image L and the PSF kernel K are estimated using a heavily downsampled blurry image and then these estimates are refined at higher and higher resolution, until the full resolution of the given blurred image is reached.

A relatively common type of a cost function used for deconvolution is a regularized least squares cost function. Typically, a regularized least squares cost function consists of (i) one or more fidelity terms, which make the minimum conform to equation (1) modeling of the blurring process, and (ii) one or more regularization terms, which make the solution more stable and help to enforce prior information about the solution, such as sparseness.

Unfortunately, existing regularized least squares cost functions are not entirely satisfactory.

SUMMARY

The present invention is directed to a method for deblurring a blurry image. In one embodiment, the method includes the steps of utilizing a spatial mask in a latent sharp image ("LSI") estimation cost function used for deconvolution of the blurry image; and utilizing a variable splitting technique in the latent sharp image estimation cost function. In this embodiment, the spatial mask is in a fidelity term of the latent sharp image estimation cost function.

Additionally or alternatively, the present invention is directed to a method for deblurring a blurry image that includes the steps of (i) utilizing a spatial mask in a PSF estimation cost function used to estimate a PSF blur kernel of the blurry image, and (ii) utilizing a variable splitting technique in the PSF estimation cost function. In this embodiment, the spatial mask is in a fidelity term of the PSF estimation cost function.

Thus, in certain embodiments, the invention can be applied to both latent sharp image and PSF estimation cost function minimization. Further, in certain embodiments, the latent sharp image cost function and/or the PSF estimation cost function are a modified regularized least squares cost function that includes one or more fidelity terms and one or more regularization terms.

As provided herein, including a spatial mask in the fidelity term of the latent sharp image estimation cost function and/or the PSF cost function will allow, for example, to (i) limit latent sharp image L and/or PSF estimation to a region of an arbitrary shape, such as a selected object in an image, (ii) mask out difficult areas in an image, such as burned out highlights, which violate convolution blurring model and make deblurring image difficult by causing strong artifacts, and/or (iii) suppress ringing artifacts around the borders of deblurred image. This improves the quality of the deblurred image.

Moreover, as provided herein, the variable splitting techniques provided herein allow for the fast minimization of the latent sharp image estimation cost function and the PSF cost function using fast Fourier transform. This will speed up the deblurring of images and will allow for image deblurring with less powerful processors (e.g. processors in cameras).

In one non-exclusive embodiment, the latent sharp image estimation cost function and/or the PSF cost function includes a fidelity term that includes: $\|M(G*K*L-G*B)\|_2^2$ where (i) L is the latent sharp image, (ii) K is a PSF kernel, (iii) B is a blurry image, (iv) G is some convolution kernel, and (v) M is the first spatial mask.

In another embodiment, the latent sharp image estimation cost function and/or the PSF cost function includes a fidelity term that includes: $\|M(K*L-B)\|_2^2$ where (i) L is the latent sharp image, (ii) K is a PSF kernel, (iii) B is a blurry image, and (iv) M is the first spatial mask.

The present invention is also directed to a device including a control system having a processor that can perform the steps provided herein.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
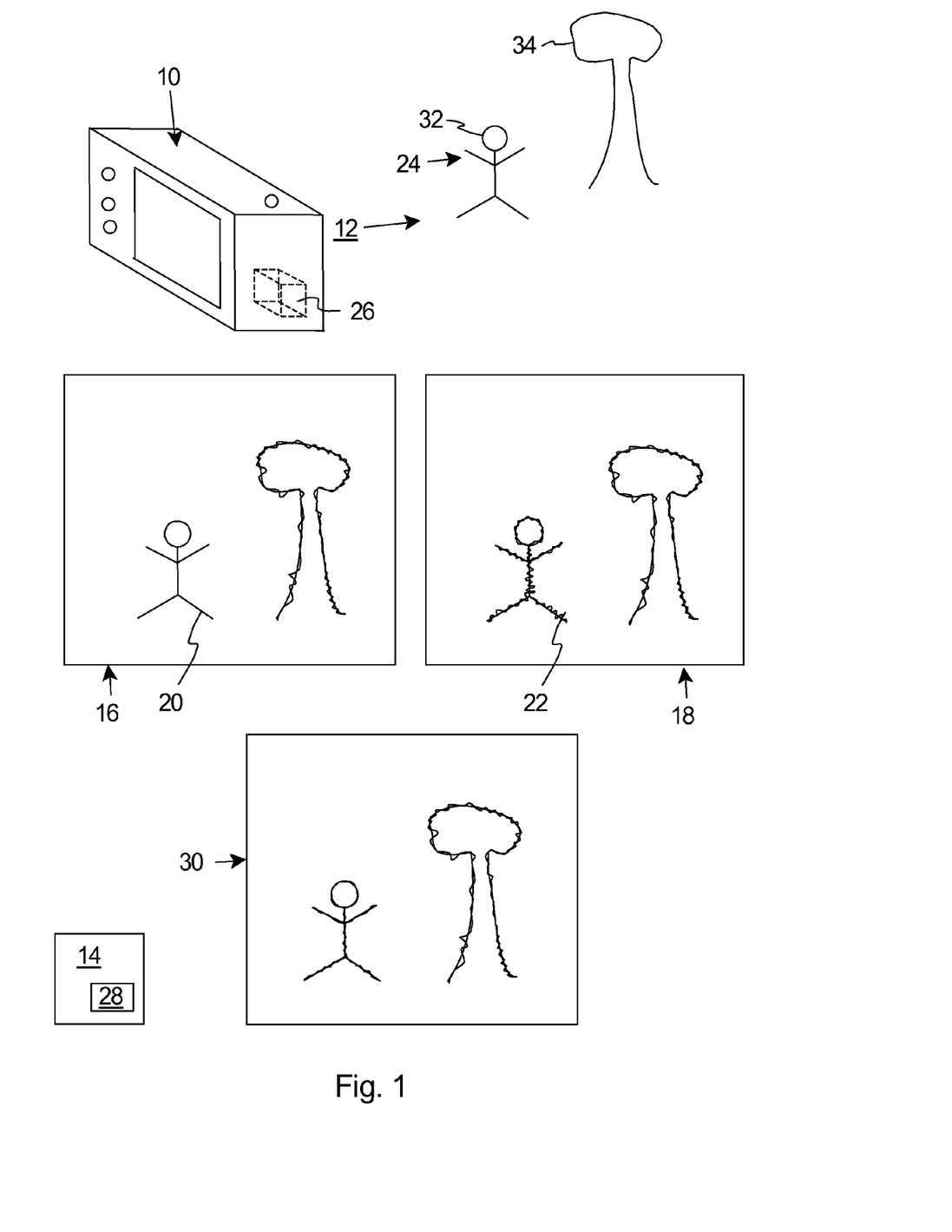
FIG. 1 is a simplified view of a scene, a computer having features of the present invention, an image apparatus having features of the present invention, a first captured image of the scene, a second captured image of the scene, and an adjusted image.

FIG. 1 is a simplified perspective view of an image apparatus 10 (e.g. a digital camera), a scene 12, and a computer 14 (illustrated as a box). FIG. 1 also illustrates a first captured image 16 (illustrated away from the image apparatus 10), and a second captured image 18 (illustrated away from the image apparatus 10) that have been captured by the image apparatus 10. In FIG. 1, the first captured image 16 is intended to illustrate a sharp image 20 (including non-wavy lines) and the second captured image 18 is intended to illustrate image blur 22 (including wavy lines). For example, movement of the image apparatus 10, and/or movement of an object 24 in the scene 12 during the capturing of the blurred image 18 can cause image blur 22. Additionally, or in the alternative, blur 22 in the image 18 can be caused by the image apparatus 10 not being properly focused when the image 18 is captured.

As an overview, in certain embodiments, the present invention is directed to (i) a unique algorithm for estimating the latent sharp image of the blurred image 18, and/or (ii) a unique algorithm for estimating a point spread function of the blurred image 18. As provided herein, a spatial mask can be used in a fidelity term of a latent sharp image estimation cost function and/or a PSF estimation cost function. Including a spatial mask in the fidelity term is desirable because it can help, for example, to (i) limit estimation of the latent sharp image and/or the PSF kernel to a region having an arbitrary shape, such as a selected object in an image, (ii) mask out difficult areas in an image, such as burned out highlights, which violate convolution blurring model and make deblurring the image difficult by causing strong artifacts, and/or (iii) suppress ringing artifacts around the borders of deblurred image. This improves the quality of the deblurred image.

In one embodiment, as provided herein, the image apparatus 10 can include a control system 26 that uses one or more of the algorithms for deconvoluting the blurred image 18. Alternatively, the computer 14 can include a control system 28 that uses one or more of the algorithms for deconvoluting the blurred image 18. In either event, the control system 26, 28 provides a deblurred latent sharp image 30 from the blurred image 18.

Further, the present cost functions can be efficiently minimized using fast Fourier transform ("FFT"). This will speed up the deblurring of images and will allow for image deblurring with less powerful processors (e.g. processors in cameras).

The present algorithm for deconvolution of the blurred image 18 can be used for non-blind convolution (the PSF is known). Further, the algorithm for deconvolution of the blurry image 18, and/or the algorithm for estimating a point spread function of the blurry image 18 can be used in blind convolution (both the latent sharp image and the PSF are unknown).

Additionally, in certain embodiments, the latent sharp image cost function and/or the PSF estimation cost function are a modified regularized least squares cost function that includes one or more fidelity terms and one or more regularization terms.

The type of scene 12 captured by the image apparatus 10 can vary. For simplicity, in FIG. 1, the scene 12 is illustrated as including two objects 24. Alternatively, the scene 12 can include one, or more than two objects 24. In FIG. 1, a first object 32 is a simplified stick figure of a person in the foreground of the scene 12, and a second object 34 is a simplified tree in the background of the scene 12.

In the first image 16, the person in the foreground is sharp and the tree in the background is slightly blurred. In contrast, in the second image 18, both the person and the tree are blurred. Finally, in one embodiment, during deconvolution of the blurred image 18, the tree in the background was masked out. As a result thereof, in the latent sharp image 30, the blur in the person has been reduced, while the blur of the tree remains approximately the same.

Each control system 26, 28 can include one or more processors and circuits. Further, either of the control systems 26, 28 can include software that utilizes one or more methods provided herein to deblur the blurry image 18.

As provided herein, the algorithms used for solving the blind deconvolution problem estimate both the PSF kernel K and the latent sharp image L. These algorithms are iterative and usually they alternate, improving the current estimates of the PSF and the latent sharp image. The steps of improving the current estimates of the PSF and the current estimate of the latent sharp image are typically in the form of solving an optimization problem. More specifically, for blind deconvolution, (i) a latent sharp image estimation cost function is formulated and minimized to find a solution for the latent sharp image estimate, and (ii) a PSF cost function is formulated and minimized to find a solution for the PSF blur kernel estimate.

One of the most common approaches to image deconvolution is re-formulating it as a regularized least squares problem, as the minimization of a latent sharp image estimation cost function that has the form $$c(L) = \|K*L-B\|_2^2 + \rho(\|D_x*L\|_2^2 + \|D_y*L\|_2^2). \quad (2)$$

In Equation 2, the term $\|K*L-B\|_2^2$ is considered a fidelity term that makes the latent sharp image L conform to the model in Equation (1) with the noise as small as possible. Further, in Equation 2, the terms $\|D_x*L\mu_2^2$ and $\|D_y*L\mu_2^2$ are considered regularization terms that help to deal with the ill-conditioned nature of the problem and noise magnification. The regularization terms can be also interpreted as a form of infusing prior information about the image. As $(\|D_x*L\|_2^2 + \|D_y*L\|_2^2)$ is made small, the gradient of latent sharp image L is forced to be sparse, with most elements being zero or close to zero, which is one of the common properties exhibited by natural images.

Additionally, in Equation 2 and elsewhere in this document, (i) c(L) is the latent sharp image estimation cost function, (ii) L is the latent sharp image, (iii) K is a PSF kernel, (iv) B is a blurry image, (v) $D_x$ and $D_y$ are the first order partial derivative operators, and (vi)$\rho$ is a weight parameter that helps to a set proper balance between the fidelity and the regularization terms so as to achieve the best compromise between the sharpness of recovered latent sharp image and the noise and other artifacts present in the reconstructed image.

Further, a common PSF cost function for estimating the PSF kernel K can be re-formulated as a regularized least squares problem, as the minimization of a PSF cost function that has the form $$c(K) = \|K*D_x*L - D_x*B\|_2^2 + \|K*D_y*L - D_y*B\|_2^2 + \theta\|K\|_2^2 \quad \text{Equation (3)}$$

In Equation 3, the term $\|K*D_x*L - D_x*B\|_2^2$ and $\|K*D_y*L - D_y*B\|_2^2$ are considered fidelity terms that makes the latent sharp image L conform to the model in Equation (1) with the noise as small as possible. Further, in Equation 3, the term $\|K\|_2^2$ is considered a regularization term that helps to deal with ill-conditioned nature of the problem and noise magnification.

Moreover, in Equation 3, (i) c(K) is the PSF cost function for the PSF kernel, and (ii) θ is a weight parameter that helps to set a proper balance between the fidelity terms and the regularization term so as to achieve the best compromise between the sharpness of recovered latent sharp image and the noise and other artifacts present in the reconstructed image. The regularization term can be also interpreted as a form of infusing prior information about the image to deal with ill-conditioned nature of the problem and noise magnification. Including $\|K\|_2^2$ in the cost function of c(K) that is minimized to find a new estimate of PSF kernel K, forces most elements of K to be very small. It thus gives preference to sparse PSF kernels that have most elements equal to 0, which is desirable in the cases of blur such as motion blur when the non-zero elements in PSF form a curve corresponding to motion trajectory.

The fact that the differential operators tend to remove the correlation between the neighboring pixels of an image is also the reason for including derivatives in the fidelity terms of the PSF cost function c(K) that is used for estimating PSF kernel K. This helps to make estimation more robust.

The minimization of latent sharp image estimation cost function c(L), and the PSF cost function c(K) that have the form Equations (2) and (3), respectively, is a pair of regularized least squares problems. When K and L are rectangular arrays of the same size and periodic convolution is considered, both these regularized least squares problem have a closed form solution. The formulas for the solutions are $$L = F^{-1}\left(\frac{\overline{F(K)}F(B)}{|F(K)|^2 + \rho(|F(D_x)|^2 + |F(D_y)|^2)}\right) \quad \text{Equation (4)}$$

And $$K = F^{-1}\left(\frac{\overline{F(L)}(|F(D_x)|^2 + |F(D_y)|^2)F(B)}{|F(L)|^2(|F(D_x)|^2 + |F(D_y)|^2) + \theta}\right), \quad \text{Equation (5)}$$

respectively. In Equations 4 and 5, the multiplication and division of arrays are both element-wise. Further, F denotes the operator of a two dimensional Fourier transform of a rectangular array using periodic extension, which can be implemented very efficiently via fast Fourier transform. As a result thereof, these closed form formulas allow for computing of the deconvolved image and the PSF relatively quickly.

In one embodiment, as provided herein, to make the process more robust and to obtain a better solution, one or both of cost functions, the latent sharp image estimation cost function c(L) in Equation (2) and/or the PSF cost function c(K) in Equation (3)) can be modified to include a weighted mask in the fidelity term of the respective cost function. Including a spatial mask in the fidelity term of the latent sharp image estimation cost function is highly desirable because it will allow, for example, to (i) limit deconvolution to a region of an arbitrary shape, such as a selected object in an image, (ii) mask out difficult areas in an image, such as burned out highlights, which violate convolution blurring model and make deblurring image difficult by causing strong artifacts, and/or (iii) suppress ringing artifacts around the borders of deblurred image. The resulting latent sharp image will have sharper edges, fewer artifacts, and less noise.

For example, the basic latent sharp image estimation cost function in Equation (2) can be modified to include a weighted mask in the fidelity term. Stated in another fashion, instead of an ordinary regularized least squares problem with the latent sharp image estimation cost function provided in Equation (2), the present invention utilizes a weighted least squares problem with the latent sharp image estimation cost function as detailed in Equation (6) below $$c(L) = \|M_1(K*L-B)\|_2^2 + \rho(\|D_x*L\|_2^2 + \|D_y*L\|_2^2). \quad \text{Equation (6)}$$

In this equation, the multiplication by $M_1$ is element-wise. In Equation 6, the term $M_1$ is a first spatial mask, e.g. an array of weights for individual pixels in the fidelity term. The number of elements in the first spatial mask is equal to the number of pixels in the fidelity term. Further, the number of elements in the first spatial mask is equal to the number of pixels in the image (actual image, extended image, upsampled image, or downsampled image). In one embodiment, the value for each element in the first spatial mask can range anywhere between 0 and 1. This allows the first spatial mask to be smooth, with no sharp transitions, so as not to cause artifacts. In this embodiment, a value of 0 for a given pixel will result in ignoring that particular pixel, while a value of 1 for a given pixel will result in maximum weight for that particular pixel. Alternatively, another type of weighting range or system can be used for the first spatial mask.

Introducing individual pixel weights in the fidelity term of the latent sharp image estimation cost function can help to solve a number of problems as it can help to ignore (or reduce the influence of) certain parts of an image during deconvolution. It thus makes it possible to perform deconvolution on an arbitrarily shaped region while still working with rectangular arrays, which leads to simpler, faster algorithms. As non-exclusive examples, deconvolution can be limited to a certain part of an image where the blur is similar and can be represented well by a single spatially invariant PSF, such as a single moving object or an object (or its part) within particular depth range in a scene. Or, difficult areas where the linear blurring model of Equation (1) fails, which tend to cause strong artifacts in a deblurred image, can be masked out and ignored during the deconvolution.

Another application of the spatial mask in the fidelity term of the latent shape image estimation cost function is to suppress ringing artifacts that tend to occur around the borders of a deblurred image. These ringing artifacts are caused by using the periodic extension of an image to perform deconvolution, to allow the use of FFT. Periodic wrapping causes large jumps at the borders, violating the blurring model in Equation (1).

In one embodiment, to avoid the creation of the ringing artifacts, the image can be extended slightly (depending on the size of the PSF) by the mirror image of the areas near image border (to minimize the jump between the image and the extension). Next, the deconvolution on the extended image is performed while masking out, e.g. using 0 in the extended region of the first spatial mask to fully mask or use a value less than 1 to create smooth transitions between the areas that are and are not masked out in the fidelity term for the added extension. Thus, the first spatial mask can mask out the jump. This can completely eliminate or reduce the influence of the jump caused when the image is periodically wrapped. After the deconvolution, the extension (which gets only partially deblurred) is cropped off. The resulting image is deblurred all the way to the boundary, with no or very little artifacts.

Somewhat similarly, the PSF estimation cost function in Equation (3) can be modified to include a weighted mask in the fidelity term. Stated in another fashion, instead of an ordinary regularized least squares problem with the PSF cost function provided in Equation (3), the present invention utilizes a weighted least squares problem with the PSF cost function as detailed in Equation (7) below $$c(K) = \|M_2(K*D_x*L - D_x*B)\|_2^2 + \|M_2(K*D_y*L - D_y*B)\|_2^2 + \theta\|K\|_2^2.$$ 
Equation (7)

In this equation, the multiplication by $M_2$ is element-wise. In Equation 7, the term $M_2$ is a second spatial mask, e.g. an array of weights for individual pixels in the fidelity term. The number of elements in the second spatial mask is equal to number of pixels in the fidelity term. Further, the number of elements in the second spatial mask is equal to the number of pixels in the image (actual image, extended image, upsampled image, or downsampled image). In one embodiment, the value for each element in the second spatial mask can range anywhere between 0 and 1. This allows the second spatial mask to be smooth, with no sharp transitions, so as not to cause artifacts. In this embodiment, a value of 0 for a given pixel will result in ignoring that particular pixel, while a value of 1 for a given pixel will result in maximum weight for that particular pixel. Alternatively, another type of weighting range or system can be used for the second spatial mask.

It should be noted that depending on the application, the values for the elements of the second spatial mask can be the same or different to values for the elements of the first spatial mask.

Introducing the second spatial mask into the PSF cost function allows for individual pixel weights in the fidelity term, and makes it possible to de-emphasize or ignore certain parts of an image during PSF estimation. It thus allows estimating PSF on an arbitrarily shaped portion of an image while still working with rectangular arrays (which leads to simpler, faster algorithms and makes it possible to use FFT for fast implementation).

With this design, the PSF estimation can be easily limited, for example, to some part of an image where the blur is approximately the same and can be represented well by a single spatially invariant PSF, such as a single moving object or an object (or its part) within particular depth range in a scene. Another example of use is masking out and ignoring difficult areas where linear blurring model of Equation (1) fails that otherwise may spoil the PSF estimation, such as oversaturated highlights.

The second spatial mask can be also used for dealing with the jump that occurs at image boundaries when periodic extension is used, which also causes problems during PSF estimation. With the present invention, the PSF estimation on image is performed while fully or partly masking out (using 0 to fully mask or using less than 1 to partly mask in the extended region of the second spatial mask) in the fidelity term for the added extension.

Unfortunately, including the first and second spatial masks in the fidelity terms makes it impossible to derive closed form formulas for the minimum of the cost functions in Equations (6) and (7), analogous to Equations (4) and (5). As provided herein, the key to deriving those formulas is the block circulant cirulant block (BCCB) structure of the matrices representing the periodic convolution of an image with a PSF and the derivative kernels, and the fact that Fourier transform matrix can be used to diagonalize such matrices. The element-wise multiplication by the masks spoils the BCCB structure. A different technique thus needs to be used to quickly find the minimum of the cost functions in Equations (6) and (7).

The present invention discloses the use of a splitting technique that makes it possible to minimize efficiently the cost function of Equations (6) and (7) with the spatial masks.

In one embodiment, the present invention modifies Equation (6) to introduce an auxiliary array R that replaces the residuum in the fidelity term, and a penalty term, $\|R-(K*L-B)\|_2^2$, that helps to split the operations of convolution and element-wise multiplication. The BCCB structure of convolution is then preserved and can be exploited to develop a fast method for finding the minimum. With this design, Equation (6) can be rewritten as a new cost function having the form $$\tilde{c}(L,R) = \|M_1 R\|_2^2 + \alpha\|R - (K*L - B)\|_2^2 + \rho(\|D_x*L\|_2^2 + \|D_y*L\|_2^2).$$
Equation (8)

In Equation 8, α (alpha) is a parameter that helps to balance the influence of the penalty term. It should be noted that Equation (8) can be minimized iteratively, by alternating minimization over R and L. In both cases, a closed form formula for the minimum exists that can be easily evaluated. In certain embodiments, it is common to increase the parameter α (alpha) during iterating minimization over R and L in alternating fashion.

In case of the minimization over R, the minimum of $$\|M_1 R\|_2^2 + \alpha \|R - (K*L - B)\|_2^2. \quad \text{Equation (9)}$$

needs to be found since the remaining term $\rho(\|D_x*L\|_2^2 + \|D_y*L\|_2^2)$ in Equation (8) is constant with reference to R. The solution of this minimization problem is $$R = \frac{K*L - B}{1 + 1/\alpha M_1^2}. \quad \text{Equation (10)}$$

In case of the minimization over L, the minimum of $$\alpha\|R - (K*L - B)\|_2^2 + \rho(\|D_x*L\|_2^2 + \|D_y*L\|_2^2) = \alpha\|K*L - (R+B)\|_2^2 + \rho(\|D_x*L\|_2^2 + \|D_y*L\|_2^2) \quad \text{Equation (11)}$$

needs to be found as the term $\|M_1 R\|_2^2$ is constant with respect to L. The solution is given by formula $$L = F^{-1}\left(\frac{\overline{F(K)}(F(R) + F(B))}{|F(K)|^2 + \rho/\alpha(|F(D_x)|^2 + |F(D_y)|^2)}\right). \quad \text{Equation (12)}$$

Thus, the fast Fourier transform ("FFT") can be used to minimize the latent sharp image estimation cost function with a weight mask in the fidelity term. In certain embodiments of the present invention, an auxiliary variable is introduced to the cost function. The auxiliary variable is used in deconvolution to split the fidelity term involving a spatial mask. This allows the cost function to be minimized using a simple algorithm that can take advantage of FFT. The proposed technique allows for minimizing the cost function quickly, by following a simple iterative algorithm that can produce a solution in only a few iterations and the implementation of which can be sped up by using FFT.

Somewhat similarly, in one embodiment, the present invention modifies Equation (7) to introduce two new auxiliary variables in the fidelity term, and two new penalty terms. More specifically, the present invention modifies Equation (7) with the following new cost function having the form $$\tilde{c}(K,R_x,R_y) = \|M_2 R_x\|_2^2 + \|M_2 R_y\|_2^2 + \beta(\|R_x - (K*D_x*L - D_x*B)\|_2^2 + \|R_y - (K*D_y*L - D_y*B)\|_2^2) + \theta\|K\|_2^2. \quad \text{Equation (13)}$$

It should be noted that Equation (13) includes new auxiliary variables $R_x$ and $R_y$ and new penalty terms $\|R_x - (K*D_x*L - D_x*B)\|_2^2$ and $\|R_y - (K*D_y*L - D_y*B)\|_2^2$.

In Equation 13, the parameter β helps to set the proper balance between the contribution of the new penalty terms and the rest of the cost function. Near the minimum of the new cost function $\tilde{c}(K,R_x,R_y)$ the penalty terms have to be small. This makes $R_x \approx K*D_x*L - D_x*B$ and $R_y \approx K*D_y*L - D_y*B$. Consequently, near its minimum $\tilde{c}(K,R_x,R_y) \approx c(K)$, and the PSF kernel K that minimizes the new cost function $\tilde{c}(K,R_x,R_y)$ is close to the one that minimizes the original cost function c(K). Although the new PSF estimation cost function looks more complicated, it is easier to minimize. An iterative algorithm that alternates the minimization over the auxiliary variables $R_x$ and $R_y$, and the PSF kernel K can be used. Each of the partial minimization problems can be solved very quickly because a closed form formula exists for the solution. The formulas allow the use of FFT for fast implementation and typically only a few iterations are needed to find the solution with sufficient accuracy. In case of the minimization over $R_x$ and $R_y$, the functions in Equations (14) and (15) will need to be minimized $$\|M_2 R_x\|_2^2 + \beta(\|R_x - (K*D_x*L - D_x*B)\|_2^2) \quad \text{Equation (14)}$$

and $$\|M_2 R_y\|_2^2 + \beta(\|R_y - (K*D_x*L - D_y*B)\|_2^2) \quad \text{Equation (15)}$$

respectively. The remaining terms in $\tilde{c}(K,R_x,R_y)$ are constant with respect to over $R_x$ and $R_y$. The minima of these two functions appear at $$R_x = \frac{K*D_x*L - D_x*B}{1 + (1/\beta)M_2^2} \quad \text{Equation (16)}$$

and $$R_y = \frac{K*D_y*L - D_y*B}{1 + (1/\beta)M_2^2} \quad \text{Equation (17)}$$

respectively. In case of minimization over K, terms $\|M_2 R_y \mu_2\|_2^2$ and $\|M_2 R_y\|_2^2$ are constant with respect to K, and we need to find the minimum of the function $$\beta(\|R_x - (K*D_x*L - D_x*B)\|_2^2 + \|R_y - (K*D_y*L - D_y*B)\|_2^2) + \theta\|K\|_2^2 = \beta(\|K*D_x*L - (D_x*B + R_x)\|_2^2 + \|K*D_y*L - (D_y*B + R_y)\|_2^2) + \theta\|K\|_2^2 \quad \text{Equation (18)}$$

which is a standard regularized least squares problem the solution of which is $$L = F^{-1}\left(\frac{\overline{F(L)}(|F(D_x)|^2 + |F(D_y)|^2)F(B) + \overline{F(D_x)}F(R_x) + \overline{F(D_y)}F(R_y)}{|F(L)|^2(|F(D_x)|^2 + |F(D_y)|^2) + \theta/\beta}\right). \quad \text{Equation (19)}$$

Thus, it is possible to use the FFT to minimize the PSF estimation cost function with a weight mask in the fidelity term. With the present invention, two auxiliary variables are introduced to the PSF estimation cost function to split the fidelity term involving a spatial mask to help to minimize such a cost function by following a simple algorithm that can take advantage of FFT. The proposed technique allows for minimizing the cost function quickly, by following a simple iterative algorithm that produces solution in only a few iterations and the implementation of which can be sped up by using FFT.

As provided herein, other possible modifications of the cost functions are possible. For example, in Equation (8), the 2-norm (the square root of the sum of squares) can be replaced by 1-norm (the sum of absolute values, total variation), in either the fidelity term or the regularization term. Using 1-norm instead of 2-norm helps to promote sparseness more strongly. Alternatively, using 2-norm instead of 1-norm tends to make most elements smaller while allowing a few elements to be bigger. In certain embodiments, 1-norm is believed to reflect the properties of natural images more accurately and to help to improve the quality of deblurred images, because it allows for sharper edges.

An efficient method for solving the minimization problem in the case of a latent shape image estimation cost function including 1-norm, involves splitting the 1-norm term into two, by introducing an auxiliary variable and an extra penalty term involving 2-norm. In case of 1-norm in the fidelity term, the latent shape image estimation cost function of Equation (8) can be rewritten to have the form of $$\tilde{c}(L,R) = \|M_1 R\|_1 + \alpha \|R - (K*L - B)\|_2^2 + \rho(\|D_x * L\|_2^2 + \|D_y * L\|_2^2). \quad \text{Equation (20)}$$

The only term in this cost function that differs in Equation (20) from the latent shape image estimation cost function in Equation (8) is $\|M_1 R\|_1$. Since this term is independent of L, the formula for the minimum of $\tilde{c}(L,R)$ over L is exactly the same as in the case of 2-norm, see Equation (12). To minimize $\tilde{c}(L,R)$ over R, one needs to minimize the function $$\|M_1 R\|_1 + \alpha \|R - (K*L - B)\|_2^2. \quad \text{Equation (21)}$$

The closed form formula for the minimum of this function is $$R = \text{sign}(K*L - B) \max\left(|K*L - B| - \frac{1}{2\alpha} M_1, 0\right). \quad \text{Equation (22)}$$

The operation described by this formula is commonly referred to as soft thresholding.

It is also possible to use a cost function with multiple fidelity terms and possibly with different spatial masks. An example of such a cost function with two spatial masks $M_1, M_2$ is:

$$c(L) = \omega \|M_1(K*L - B)\|_2^2 + \xi(\|M_2(K*D_x*L - D_x*B)\|_2^2 + \|M_2(K*D_y*L - D_y*B)\|_2^2) + \rho(\|D_x*L\|_2^2 + \|D_y*L\|_2^2). \quad \text{Equation (23)}$$

In this case, three auxiliary variables $(R, R_x, R_y)$ need to be introduced and three penalty terms $\|R - (K*L - B)\|_2^2$, $\|R_x - (K*D_x*L - D_x*B)\|_2^2$, and $\|R_y - (K*D_y*L - D_y*B)\|_2^2$ one for each fidelity term. The resulting new cost function is $$\tilde{c}(L, R, R_x, R_y) = \quad \text{Equation (24)}$$
$$\omega(\|M_1 R\|_2^2 + \alpha \|R - (K*L - B)\|_2^2) +$$
$$\xi(\|M_2 R_x\|_2^2 + \|M_2 R_y\|_2^2) +$$
$$\beta(\|R_x - (K*D_x*L - D_x*B)\|_2^2 +$$
$$\|R_y - (K*D_y*L - D_y*B)\|_2^2)) +$$
$$\rho(\|D_x*L\|_2^2 + \|D_y*L\|_2^2)$$

In Equation (24), $\alpha$ and $\beta$ are parameters that help to balance the influence of the respective penalty terms.

To find the minimum of this new cost function, minimization over R, Rx, Ry, and L is performed iteratively, in alternating fashion. For each of these minimization problems a closed form formula exists. The formulas are:

$$R = \frac{K*L - B}{1 + (1/\alpha)M_1^2} \quad \text{Equation (25)}$$

$$R_x = \frac{K*D_x*L - D_x*B}{1 + (1/\beta)M_2^2} \quad \text{Equation (26)}$$

$$R_y = \frac{K*D_y*L - D_y*B}{1 + (1/\beta)M_2^2} \quad \text{Equation (27)}$$

$$L = F^{-1}\left(\frac{\omega\alpha\overline{F(K)}(F(R) + F(B) + \xi\beta\overline{F(K)F(D_x)})}{\omega\alpha|F(K)|^2 + \xi\beta|F(K)|^2(|F(D_x)|^2 + |F(D_y)|^2) + \rho(|F(D_x)|^2 + |F(D_y)|^2)}\right) \quad \text{Equation (28)}$$

With this type of cost function, also, 1-norm can be used in all the fidelity terms instead of 2-norm. Equations (25) to (27) then change to soft thresholding formulas similar to Equation (22).

Additionally or alternatively, it is possible to make modifications also to the regularization term. If the new regularization term involves 2-norm, then only the formula for computing L becomes slightly different. The term $\rho(|F(D_x)|^2 + |F(D_y)|^2)$ in Equation (12) or (28) is replaced by $\rho|F(G)|^2$, $\rho$ or other appropriate term, depending on the form of regularization term(s), in the same way as when no spatial mask is used. If there is a regularization term that involves 1-norm, it can be handled by additional splitting, by introducing another auxiliary variable and a penalty term.

It is also possible to use cost function with a fidelity term that involves some convolution operator applied to an image. As an example, the PSF estimation cost function of Equation (7) can be modified as follows:

$$c(K) = \|M_2(K*G*L - G*B)\|_2^2 + \|K\|_2^2. \quad \text{Equation (29)}$$

In Equation (29), G is a general kernel that replaced the derivative $D_x$ in Equation (7). Further to arrive at Equation (29), terms including the derivative $D_y$ in Equation (7) have been skipped. It should be noted that the other cost functions can be modified in a similar fashion.

As provided herein, in certain embodiments, the present invention uses post-processing of the latent sharp image L and its derivatives to improve the speed of convergence and the robustness of the PSF estimation algorithm. The post-processed derivatives of the latent sharp image can be denoted as $L_x$ and $L_y$. Similarly $B_x$ and $B_y$ can be used to denote partial derivatives of blurry image B, and $K_x$ and $K_y$ can be used to denote partial derivatives of the PSF kernel K, which all may or may not be post-processed.

In yet another embodiment, the latent sharp image estimation cost function can be rewritten as follows:

$$c(L) = \omega \|M_1(K*L - B)\|_q^q + \quad \text{Equation (30)}$$
$$\xi(\|M_2(L*K_x - B_x)\|_q^q + \|M_2(L*K_y - B_y)\|_q^q) +$$
$$\rho(\|D_x*L\|_2^2 + \|D_y*L\|_2^2).$$

In Equation (30) q can be equal to two or one (q=2 or q=1). Equation (30) can be rewritten to include auxiliary variables and penalty terms as the following cost function:

$$\tilde{c}(L, R, R_x, R_y) = \omega(\|M_1 R\|_q^q + \alpha \|R - (K*L - B)\|_2^2) + \quad \text{Equation (31)}$$
$$\xi(\|M_2 R_x\|_q^q + \|M_2 R_y\|_q^q + \beta(\|R_x - (K_x*L - B_x)\|_2^2 +$$
$$\|R_y - (K_y*L - B_y)\|_2^2)) +$$
$$\rho(\|D_x*L\|_2^2 + \|D_y*L\|_2^2).$$

Equation (31) can be minimized iteratively by alternating the minimization over R,$R_x$,$R_y$, and L and the formulas for the solutions of the partial minimization steps are as follows. When q=2, $$R = \frac{K*L - B}{1 + (1/\alpha)M_1^2} \quad \text{Equation (32)}$$

$$R_x = \frac{K_x * L - B_x}{1 + (1/\beta)M_2^2} \quad \text{Equation (33)}$$

$$R_y = \frac{K_y * L - B_y}{1 + (1/\beta)M_2^2} \quad \text{Equation (34)}$$

Alternatively, when q=1, $$R = sthr\left(K * L - B, \frac{1}{2\alpha}M_1\right) \quad \text{Equation (35)}$$

$$R_x = sthr\left(K_x * L - B_x, \frac{1}{2\beta}M_2\right) \quad \text{Equation (36)}$$

$$R_y = sthr\left(K_y * L - B_y, \frac{1}{2\beta}M_2\right) \quad \text{Equation (37)}$$

where sthr is the soft thresholding operator given by formula $$sthr(x,t) = \text{sign}(x)\max(|x|-t, 0) \quad \text{Equation (38)}$$

and for arrays this operator is applied element-wise. The formula for L is the same for both q=1 and q=2, $$L = F^{-1}\left(\frac{\omega\alpha\overline{F(K)}(F(R) + F(B)) + \beta\theta(\overline{F(K_x)}(F(R_x) + (F(B_x)) + \overline{F(K_y)}(F(R_y) + F(B_y)))}{\alpha\omega|F(K)|^2 + \beta\theta(|F(K_x)|^2 + |F(K_y)|^2) + \rho(|F(D_x)|^2 + |F(D_y)|^2)}\right) \quad \text{(Equation 39)}$$

In yet another embodiment, the PSF cost function can be modified to the have the following form:

$$c(K) = \omega\|M_1(K*L-B)\|_p^p + \xi(\|M_2(K*L_x-B_x)\|_p^p + \|M_2(K*L_y-B_y)\|_p^p) + \theta\|K\|_2^2\sigma(\|D_x*K\|_2^2 + (\|D_y*K\|_2^2). \quad \text{Equation (40)}$$

In Equation (40) p can be equal to two or one (p=2, or p=1). Equation (40) can be rewritten to include auxiliary variables and penalty terms as follows:

$$\tilde{c}(L, R, R_x, R_y) = \quad \text{Equation (41)}$$
$$\omega\|M_1 R\|_p^p + \alpha\|R - (K*L - B)\|_2^2 + \xi(\|M_2 R_x\|_p^p +$$
$$\|M_2 R_y\|_p^p + \beta(\|R_x - (L_x * K - B_x)\|_2^2 +$$
$$\|R_y - (L_y * K - B_Y)\|_2^2)) +$$
$$\theta\|K\|_2^2 + \sigma(\|D_x * K\|_2^2 + \|D_y * K\|_2^2).$$

Equation (41) can be minimized iteratively by alternating the minimization over R, Rx, Ry, and L and the formulas for the solutions of the partial minimization steps are as follows. When p=2, $$R = \frac{L*K - B}{1 + (1/\alpha)M_1^2} \quad \text{Equation (42)}$$

$$R_x = \frac{L_x * K - B_x}{1 + (1/\beta)M_2^2} \quad \text{Equation (43)}$$

$$R_y = \frac{L_y * K - B_y}{1 + (1/\beta)M_2^2}. \quad \text{Equation (44)}$$

Alternatively, when p=1, $$R = sthr\left(L * K - B, \frac{1}{2\alpha}M_1\right). \quad \text{Equation (45)}$$

$$R_x = sthr\left(L_x * K - B_x, \frac{1}{2\beta}M_2\right). \quad \text{Equation (46)}$$

$$R_y = sthr\left(L_y * K - B_y, \frac{1}{2\beta}M_2\right). \quad \text{Equation (47)}$$

The formula for K is the same for both p=1 and p=2, $$K = F^{-1}\left(\frac{\alpha\omega\overline{F(L)}(F(R) + F(B)) + \beta\theta(\overline{F(L_x)}(F(R_x) + (F(B_x)) + \overline{F(L_y)}(F(R_y) + F(B_y)))}{\alpha\omega|F(L)|^2 + \beta\theta(|F(L_x)|^2 + |F(L_y)|^2) + \theta + \sigma(|F(D_x)|^2 + |F(D_y)|^2)}\right) \quad \text{Equation (48)}$$

Figure 2:
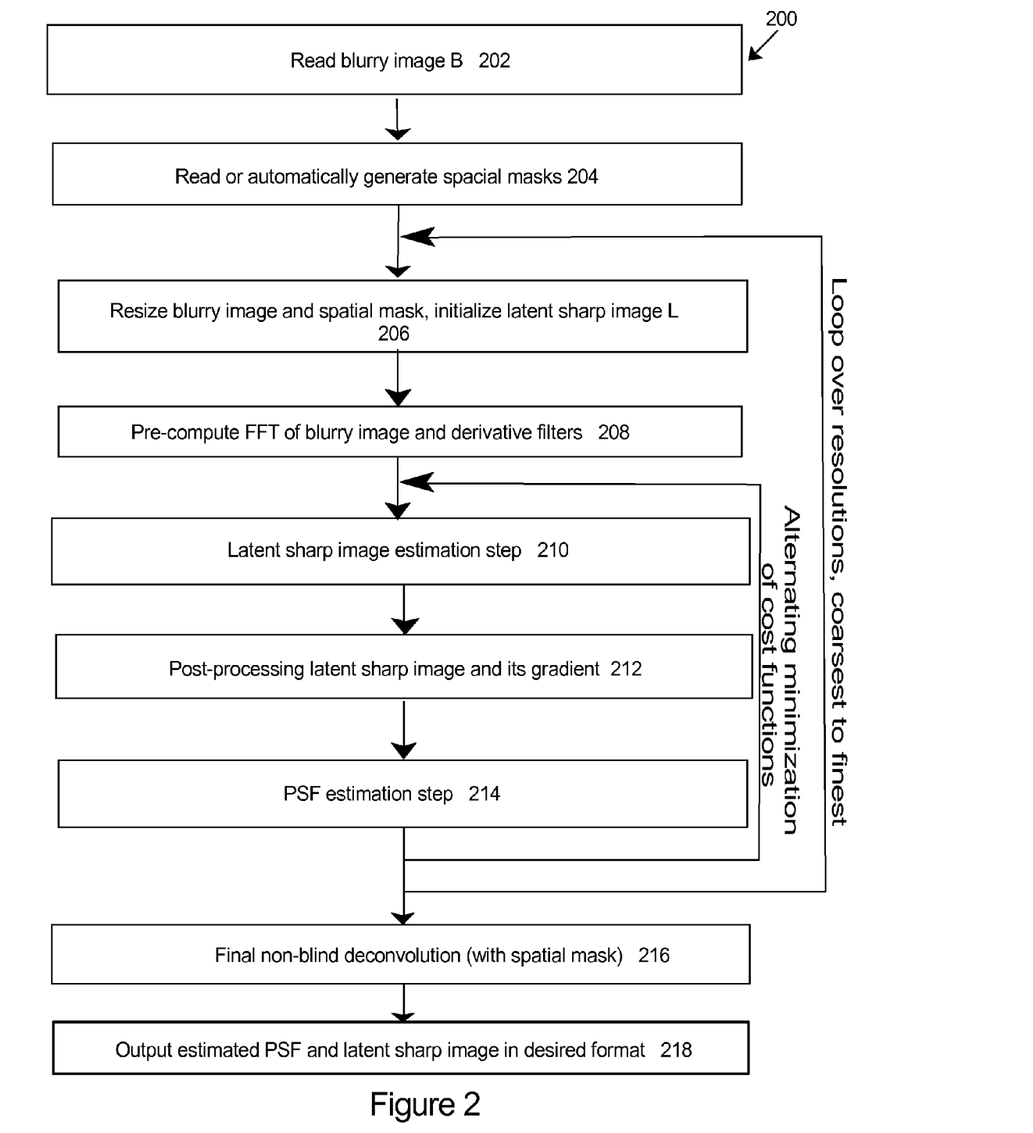
FIG. 2 is a flow chart that illustrates one embodiment of an image deblurring method having features of the present invention.

In yet another embodiment, as provided herein, the spatial masks can also be used in the regularization term of the point spread function estimation cost function and/or the PSF cost function. Including a spatial mask in the regularization term is desirable because it makes it possible not to penalize large values of elements that should be large and to penalize more strongly large values of elements that should not be large. This can help to reduce the influence of noise in the blurry image on the estimated PSF and the reconstructed latent sharp image and to promote sharp edges in the latent sharp image. Prior information about the properties of a sought latent sharp image (some natural image model) and about noise properties need to be incorporated to reduce the ambiguity and to make it possible to find the desired solution. Thus, as provided herein, the algorithms can be combined and used to minimize efficiently cost functions that involve spatial masks in both fidelity and regularization terms. FIG. 2 is a flow chart that illustrates one non-exclusive embodiment of a blind deconvolution algorithm 200. In this embodiment, at step 202, the blurry image B is read. The entire image can be analyzed, or to save computation time, a grayscale patch of the blurry image B can be generated for PSF estimation. As provided herein, often only a portion of the blurry image or one of color channels of the blurry images is initially utilized so as to save computation time. Subsequently, the deconvolution of the entire blurry image is performed separately, at the end.

Next, at step 204, a first spatial mask and/or a second spatial mask is read, automatically generated, or generated by the user. For example, the user can manually generate one or both of the spatial masks using the mouse of the computer to select arbitrary shape or select one or more objects or areas in an image. Alternatively, the spatial masks can be generated by software that identifies different depth layers, identifies faces, identifies eyes, identifies burned out highlights, and/or strong edges in the image and around image boundaries. The spatial masks can be used in the fidelity term of the cost functions.

Subsequently, at step 206, the blurry image and the spatial masks can be resized and the latent sharp image L is initialized.

Next, at step 208, the FFT of the blurry image and the derivative filters are pre-computed.

At step 210, the latent sharp image is estimated. A more detailed discussion of latent sharp image estimation is provided in below and illustrated in FIG. 4.

Subsequently, at step 212, the latent sharp image is post-processed. For example, this step can include denoising and/or sharpening.

Next, at step 214, the PSF is estimated. A more detailed discussion of PSF estimation is provided below and illustrated in FIG. 3.

In one embodiment, the PSF estimation and the latent sharp image estimation can be solved in iterations by minimizing the PSF estimation cost function, and by minimizing the latent sharp image estimation cost function in alternating fashion. Thus, steps 210-214 are repeated alternating the minimization of the PSF estimation cost function and the latent sharp image estimation cost function.

In addition to alternating minimization of the PSF estimation cost function, and the latent sharp image estimation cost function, it is also common to use a multi-resolution approach, where first the coarse versions of the latent sharp image L and the PSF kernel K are estimated using a heavily downsampled blurry image and then these estimates are refined at higher and higher resolution, until the full resolution of the given blurred image is reached. Thus, the steps 206-214 are repeated starting at the coarsest resolution and moving to finer and finer resolutions. The number of iterations for each resolution can be varied to achieve desired deblurring effect.

After the final PSF blur kernel is determined, at step 216, the final deconvolution is performed on the blurry image with the spatial mask utilizing the final PSF blur kernel.

Finally, at step 218, the PSF and the latent sharp image is output in the desired format.

Figure 3:
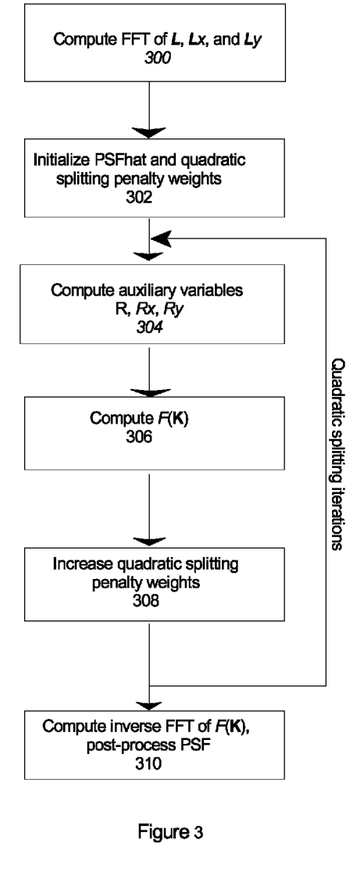
FIG. 3 is a flow chart that illustrates one embodiment of a PSF blur kernel estimation step.

FIG. 3 is a flow chart that illustrates one, non-exclusive embodiment of PSF estimation step 214. First, at step 300, the fast Fourier transform of L, $L_x$, and $L_y$ are computed.

Next, at step 302, the PSFhat and quadratic splitting penalty weights are initialed.

Subsequently, at step 304, the auxiliary variables R, Rx, and Ry are computed. For example, these variables can be computed utilizing Equations (42), (43), (44), respectively.

At step 306, the F(K) is estimated. For example, Equation (48) can be used to estimate F(K).

Next, at step 308, the quadratic splitting penalty weights are increased.

Step 304-308 are repeated for quadratic splitting iterations.

Subsequently, at step 310, the inverse FFT of F(K) is computed, and the PSF is post-processed.

Figure 4:
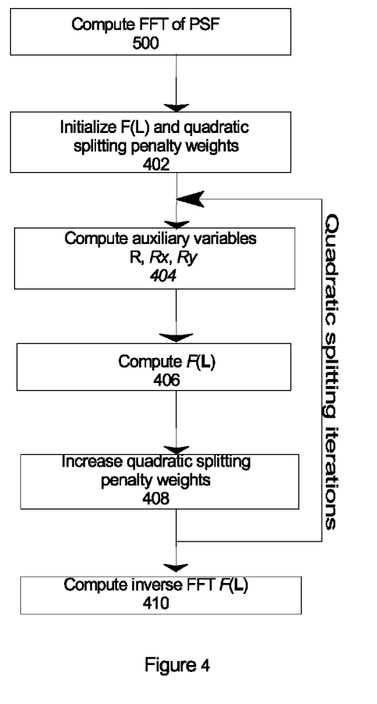
FIG. 4 is a flow chart that illustrates one embodiment of a latent sharp image estimation step.

FIG. 4 is a flow chart that illustrates one embodiment of Latent sharp image estimation step 210. First, at step 400, the FFT of PSF is computed.

Next, at step 402, the F(L) and quadratic splitting penalty weights are initialed.

Subsequently, at step 404, the auxiliary variables R, Rx, and Ry are computed. For example, these variables can be computed utilizing Equations (25), (26), (27), respectively.

At step 406, the F(L) is computed. For example, Equation (28) can be used to estimate F(L).

Next, at step 408, the quadratic splitting penalty weights are increased.

Step 404-408 are repeated for quadratic splitting iterations.

Subsequently, at step 410, the inverse FFT of F(L) is computed.

Figure 5A:
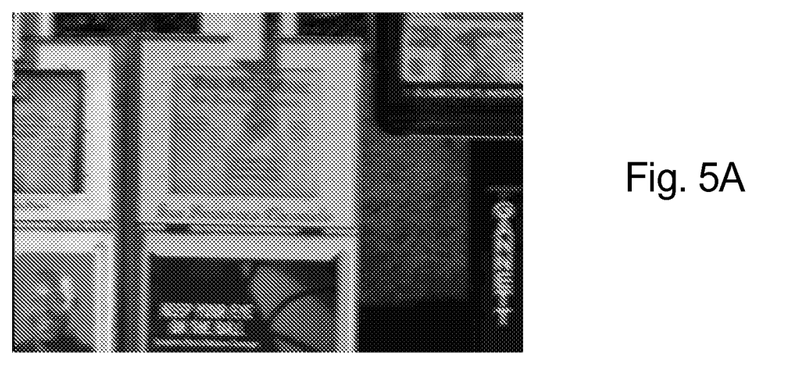
FIG. 5A illustrates a blurry image.
Figure 5B:
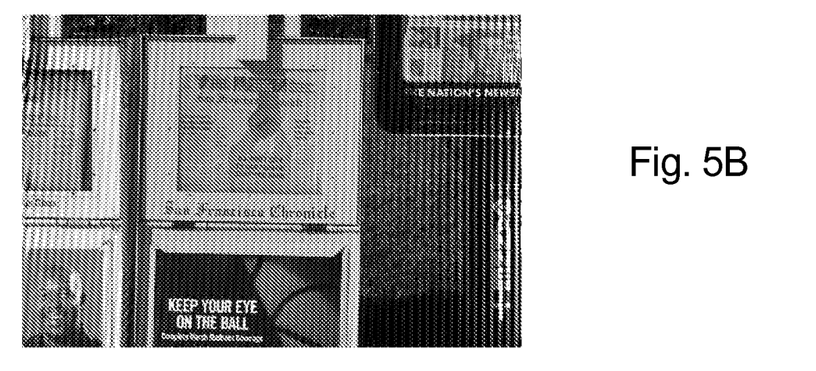
FIG. 5B illustrates a deblurred image that was deblurred using a prior art method.
Figure 5C:
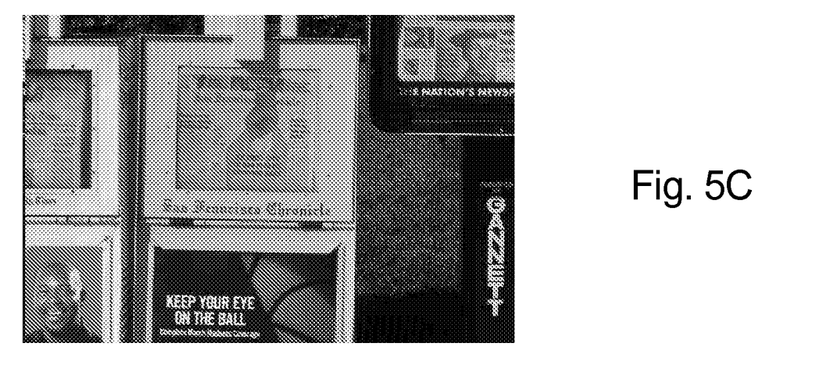
FIG. 5C illustrates a deblurred image that was deblurred using one of the methods provided herein.

FIG. 5A illustrates a blurry image, FIG. 5B illustrates a deblurred image (of that shown in FIG. 5A) that was deblurred using a prior art method, and FIG. 5C illustrates a deblurred image (of that shown in FIG. 5A) that was deblurred using one of the methods provided herein. It should be noted that the prior art deblurred image in FIG. 5B includes ringing around the image boundaries. In contrast, because of the use of the spatial mask in one or both cost functions, the deblurred image illustrated in FIG. 5C does not have noticeable ringing around the boundaries. As a result thereof, the resulting deblurred image is better.

Figure 6A:
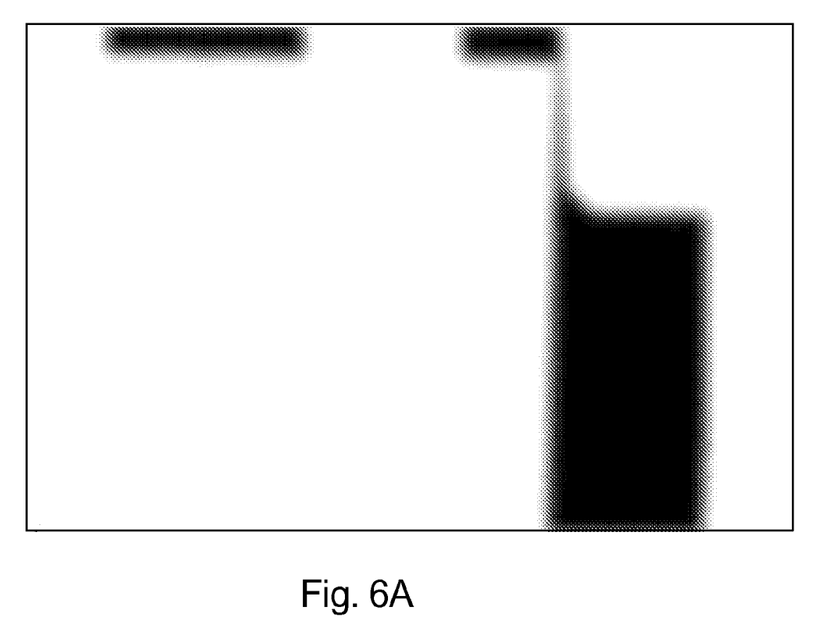
FIG. 6A illustrates a first embodiment of a spatial mask.

FIG. 6A illustrates a first embodiment of a spatial mask that can be used during deblurring of the blurry image illustrated in FIG. 5A. In one embodiment, the white areas of the spatial mask represent a value of one (1), the black areas in the spatial mask represent a value of zero (0), and the gray areas in the spatial mask represent a value between zero (0) and one (1). The spatial mask can be created manually or automatically. Further, the spatial mask can be used in either or both the PSF and the latent sharp image estimation cost functions. In this embodiment, the pixels constituting the portion of the image that captured objects in the foreground were given a value of one (1), while the pixels constituting the portion of the image that captured objects in the background were given a value of zero (0).

Figure 6B:
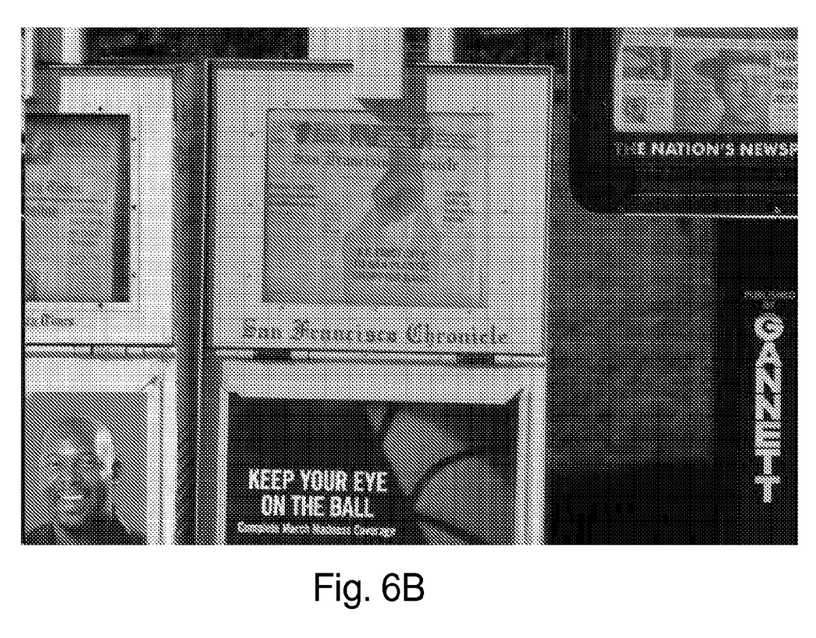
FIG. 6B illustrates a deblurred image that was deblurred using the spatial mask of FIG. 6A.

FIG. 6B illustrates a deblurred image that was deblurred using the spatial mask of FIG. 6A using the cost functions disclosed herein. In this example, comparing FIGS. 5A and 6B, the foreground was deblurred because of the ones in the spatial mask, while the background was not deblurred because of the zeros in the spatial mask.

Figure 7A:
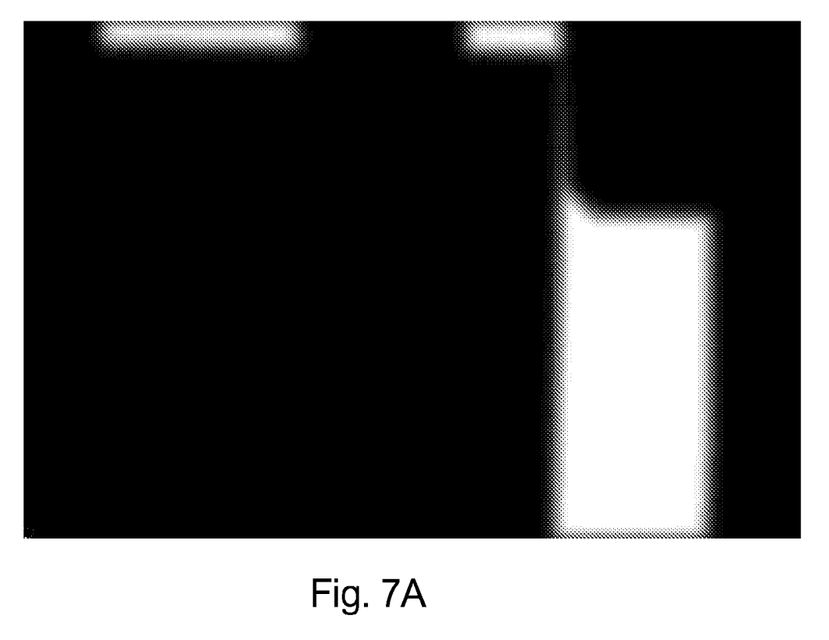
FIG. 7A illustrates another embodiment of a spatial mask.

FIG. 7A illustrates another embodiment of a spatial mask that can be used during deblurring of the blurry image illustrated in FIG. 5A. In this embodiment, the white areas of the spatial mask represent a value of one (1), the black areas in the spatial mask represent a value of zero (0), and the gray areas in the spatial mask represent a value between zero (0) and one (1). The spatial mask can be created manually or automatically. Further, the spatial mask can be used in either or both the PSF and the latent sharp image estimation cost functions. In this embodiment, the portion of the image that captured objects in the foreground were given a value of zero (0), while the portion of the image that captured objects in the background were given a value of one (1).

Figure 7B:
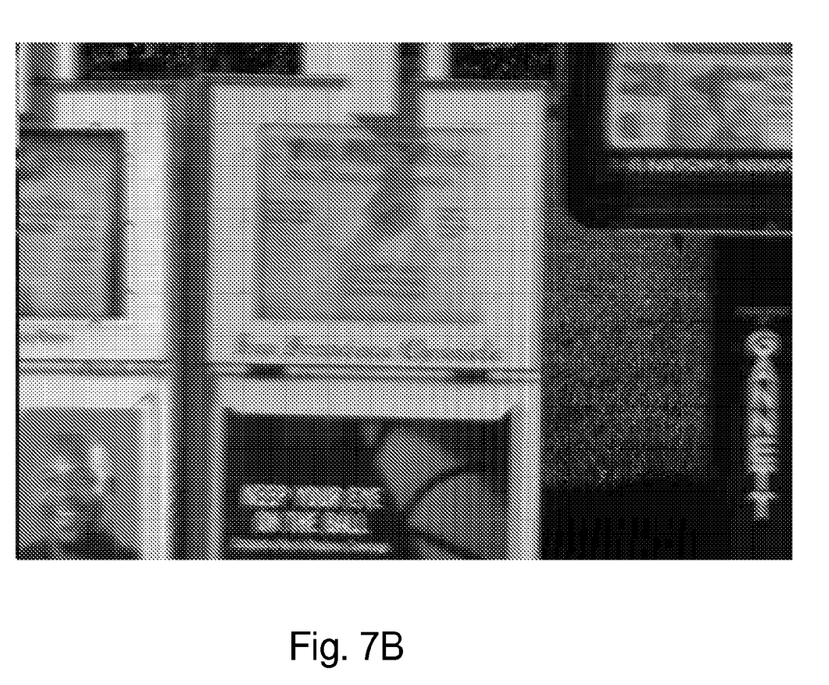
FIG. 7B illustrates a deblurred image that was deblurred using the spatial mask of FIG. 7A.

FIG. 7B illustrates a deblurred image that was deblurred using the spatial mask of FIG. 7A using the cost functions disclosed herein. In this example, comparing FIGS. 5A and 7B, the background was deblurred because of the ones in the spatial mask, while the foreground was not deblurred because of the zeros in the spatial mask.

Figure 8A:
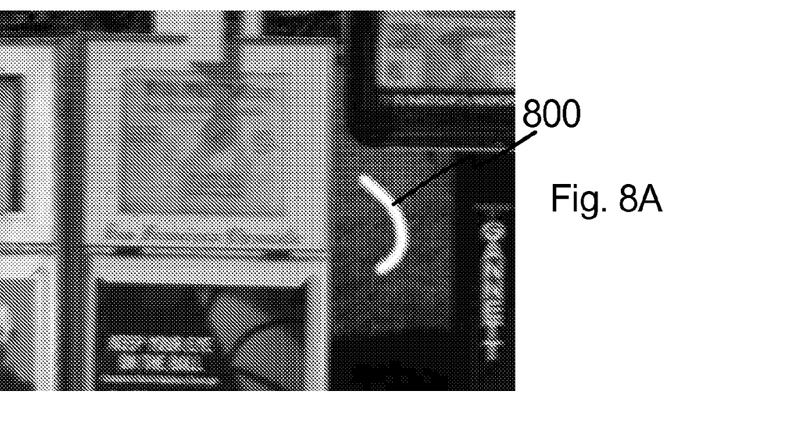
FIG. 8A illustrates another blurry image.
Figure 8B:
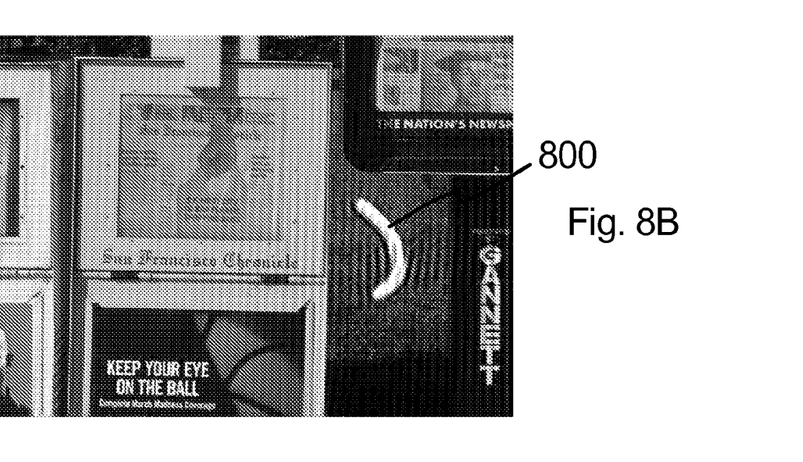
FIG. 8B illustrates a deblurred image that was deblurred using a prior art method.
Figure 8C:
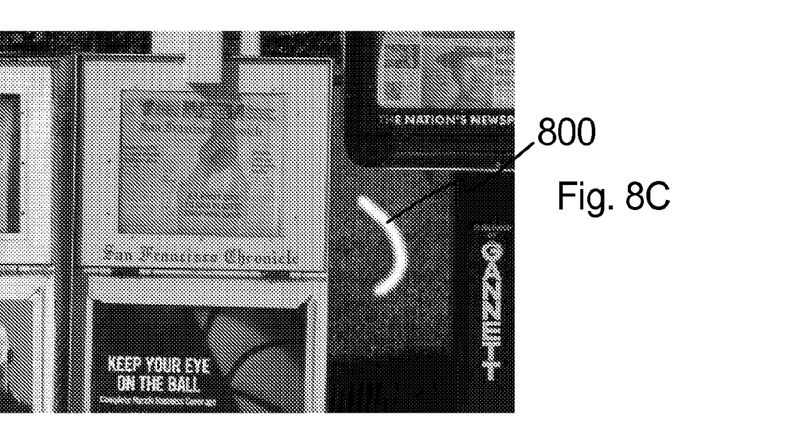
FIG. 8C illustrates a deblurred image that was deblurred using one of the methods provided herein.

FIG. 8A illustrates another blurry image that is somewhat similar to the blurry image illustrated in FIG. 5A. However, in this embodiment, the blurry image includes an arched shaped, burned out highlight 800. FIG. 8B illustrates a deblurred image (of that shown in FIG. 8A) that was deblurred using a prior art method, and FIG. 8C illustrates a deblurred image (of that shown in FIG. 8A) that was deblurred using one of the methods provided herein. It should be noted that the prior art deblurred image in FIG. 8B includes ringing because of the burned out highlight 800. In contrast, because of the use of the spatial mask in one or both cost functions, the deblurred image illustrated in FIG. 8C does not have noticeable ringing. For example, the spatial mask can include zeros (0) for the area of the burned out highlight 800 so that the problematic regions of the blurry image can be avoided during deconvolution. As a result thereof, the resulting deblurred image is better.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for estimating a latent sharp image for at least a portion of a blurry image, the method comprising the steps of:
    estimating the latent sharp image with a control system that includes a processor (i) utilizing a first spatial mask in a fidelity term of a latent sharp image estimation cost function, the first spatial mask being a first array of individual weights for individual pixels in the fidelity term, and
    (ii) utilizing a variable splitting technique in the fidelity term during minimization of the latent sharp image estimation cost function with the control system by introducing a first auxiliary variable and a first penalty term into the fidelity term of the latent sharp image estimation cost function to help split the operations of convolution and element-wise multiplication by the control system.

2. The method of claim 1 wherein the step of utilizing a variable splitting technique includes minimization of the latent sharp image estimation cost function over an unknown latent sharp image L and the first auxiliary variable in an alternating fashion.

3. The method of claim 2 wherein the step of utilizing a variable splitting technique includes minimization of the latent sharp image estimation cost function using fast Fourier transform.

4. The method of claim 1 wherein the step of utilizing a variable splitting technique includes minimization of the latent sharp image estimation cost function using fast Fourier transform.

5. The method of claim 1 wherein the step of estimating the latent sharp image with the control system includes the latent sharp image estimation cost function including a fidelity term that includes:

$$\|M(G*K*L - G*B)\|_2^2$$

where (i) L is the latent sharp image, (ii) K is a PSF kernel, (iii) B is a blurry image, (iv) G is a general kernel, and (v) M is the first spatial mask.

6. The method of claim 1 wherein the step of estimating the latent sharp image with the control system includes the latent sharp image estimation cost function including a fidelity term that includes:

$$\|M(K*L - B)\|_2^2$$

where (i) L is the latent sharp image, (ii) K is a PSF kernel, (iii) B is a blurry image, and (iv) M is the first spatial mask.

7. The method of claim 1 wherein the step of estimating the latent sharp image with the control system includes the latent sharp image estimation cost function being a modified regularized least squares cost function that includes one or more fidelity terms and one or more regularization terms.

8. The method of claim 1 further comprising the step of estimating a PSF kernel with the control system (i) utilizing a second spatial mask in a fidelity term of a PSF cost function used for the PSF kernel estimation of the blurry image, and (ii) utilizing a variable splitting technique during minimization of the PSF cost function with the control system by introducing a second auxiliary variable and a second penalty term into the fidelity term of the PSF estimation cost function.

9. The method of claim 8 wherein the step of utilizing a variable splitting technique during minimization of the PSF estimation cost function includes minimization over an unknown PSF kernel K and the second auxiliary variable in an alternating fashion.

10. The method of claim 9 wherein the step of utilizing a variable splitting technique during minimization of the PSF cost function includes using fast Fourier transform.

11. The method of claim 1 further comprising the step of capturing the blurry image with an image apparatus that includes the control system.

12. The method of claim 1 further comprising the step of capturing the blurry image with an image apparatus and transferring the image to a computer that includes the control system.

13. A method for estimating a PSF blur kernel of at least a portion of a blurry image, the method comprising the steps of:
    estimating the PSF blur kernel with a control system that includes a processor (i) utilizing a spatial mask in a fidelity term of a PSF estimation cost function, the spatial mask being an array of individual weights for individual pixels in the fidelity term, and
    (ii) utilizing a variable splitting technique during minimization of the PSF estimation cost function with the control system by introducing an auxiliary variable and a penalty term into the PSF estimation cost function to help split the operations of convolution and element-wise multiplication by the control system.

14. The method of claim 13 wherein the step of utilizing a variable splitting technique during minimization of the PSF estimation cost function includes minimization over an unknown PSF kernel K and the auxiliary variable in an alternating fashion.

15. The method of claim 14 wherein the step of utilizing a variable splitting technique includes minimization of the PSF cost function using fast Fourier transform.

16. The method of claim 13 wherein the step of utilizing a variable splitting technique includes minimization of the PSF cost function using fast Fourier transform.

17. The method of claim 13 wherein the step of estimating the PSF blur kernel with the control system includes the PSF estimation cost function being a modified regularized least squares cost function that includes one or more fidelity terms and one or more regularization terms.

18. The method of claim 13 further comprising the step of capturing the blurry image with an image apparatus that includes the control system.

19. The method of claim 13 further comprising the step of capturing the blurry image with an image apparatus and transferring the image to a computer that includes the control system.

* * * * *